(12) United States Patent
Bradberry et al.

(10) Patent No.: US 7,963,014 B2
(45) Date of Patent: Jun. 21, 2011

(54) METHOD FOR RETROFITTING AN EXISTING IDLER ASSEMBLY

(75) Inventors: Edwin Bradberry, Cliff, NM (US); Chris Peralta, Mule Creek, NM (US); Leeland Boday, Morenci, AZ (US)

(73) Assignee: Freeport-McMoRan Copper & Gold Inc., Phoenix, AZ (US)

( * ) Notice: Subject to any disclaimer, the term of this patent is extended or adjusted under 35 U.S.C. 154(b) by 0 days.

(21) Appl. No.: 12/537,819

(22) Filed: Aug. 7, 2009

(65) Prior Publication Data
US 2009/0293252 A1 Dec. 3, 2009

Related U.S. Application Data

(62) Division of application No. 11/252,894, filed on Oct. 18, 2005, now Pat. No. 7,644,999.

(51) Int. Cl.
*B23P 6/00* (2006.01)
*B62D 55/14* (2006.01)
*F16C 35/00* (2006.01)

(52) U.S. Cl. .......... 29/402.08; 29/402.09; 29/401.1; 29/402.12; 29/402.13; 29/402.14; 29/402.16

(58) Field of Classification Search .......... 305/130, 305/132, 136, 138, 195, 199, 15, 19, 137, 305/143; 474/152, 160; 301/1, 111.02, 111.04, 301/126; 29/402.03, 402.08, 402.09, 402.11, 29/402.12, 402.13, 402.14, 402.16, 402.18, 29/401.1
See application file for complete search history.

(56) References Cited

U.S. PATENT DOCUMENTS

| | | | |
|---|---|---|---|
| 1,443,556 A | 1/1923 | Beal et al. |
| 1,796,533 A | 3/1931 | Pearson |
| 1,990,806 A | 6/1931 | Watson et al. |
| 2,827,339 A | 3/1958 | Zunich |
| 3,580,345 A | 5/1971 | Brown et al. |
| 3,773,393 A | 11/1973 | Story et al. |
| 3,993,356 A | 11/1976 | Groff et al. |
| 4,141,598 A | 2/1979 | Cline |
| 4,406,641 A | 9/1983 | Mallet |
| 4,448,273 A | 5/1984 | Barbieri |
| 4,527,039 A | 7/1985 | Fuwesi |
| 4,582,153 A | 4/1986 | Shinsen |
| 4,695,102 A | 9/1987 | Crotti |

(Continued)

OTHER PUBLICATIONS

International Search Report dated Aug. 22, 2007 for PCT Application No. PCT/US2006/040495, 4 pages.

(Continued)

*Primary Examiner* — Essama Omgba
(74) *Attorney, Agent, or Firm* — Fennemore Craig, P.C.

(57) ABSTRACT

A method for retrofitting a piece of equipment having a flexible track assembly is disclosed and may include disassembling an existing idler shaft from an idler gear and from at least one bearing block attached to the piece of equipment. The method may also include attaching a sleeve within the opening of the idler gear. A new idler shaft may then be positioned within an opening of at least one of the bearing blocks and within an opening in the sleeve. The new idler shaft and idler gear being configured such that the new idler shaft, idler gear, and sleeve rotate together. The method may then include placing at least one bushing liner within the opening of at least one bearing block and attaching a retaining device to at least one end of the new idler shaft to retain the new idler shaft axially.

19 Claims, 14 Drawing Sheets

U.S. PATENT DOCUMENTS

| | | |
|---|---|---|
| 4,739,852 A | 4/1988 | Stevens et al. |
| 4,815,794 A | 3/1989 | Becker et al. |
| 4,838,373 A | 6/1989 | Price et al. |
| 4,923,257 A | 5/1990 | Purcell |
| 4,987,965 A | 1/1991 | Bourret |
| 6,006,847 A | 12/1999 | Knight |
| 6,227,354 B1 * | 5/2001 | Howden et al. ............... 198/834 |
| 6,250,577 B1 | 6/2001 | Koenig |
| 6,364,438 B1 | 4/2002 | Hasselbusch et al. |
| 6,457,786 B1 | 10/2002 | Maguire |
| 6,655,482 B2 | 12/2003 | Simmons |
| 6,761,235 B2 | 7/2004 | Simmons |
| 7,100,715 B2 * | 9/2006 | Mukaino et al. ............... 180/9.1 |
| 7,309,218 B1 * | 12/2007 | Lewis et al. .................... 417/360 |
| 7,644,999 B2 * | 1/2010 | Bradberry et al. ............. 305/136 |
| 2007/0057575 A1 * | 3/2007 | Brandt et al. .................. 305/136 |

OTHER PUBLICATIONS

Written Opinion dated Aug. 22, 2007 for PCT Application No. PCT/US2006/040495, 4 pages.

Examination Report for Australian patent Application No. 2006304449 dated Oct. 29, 2009, 5 pages.

* cited by examiner

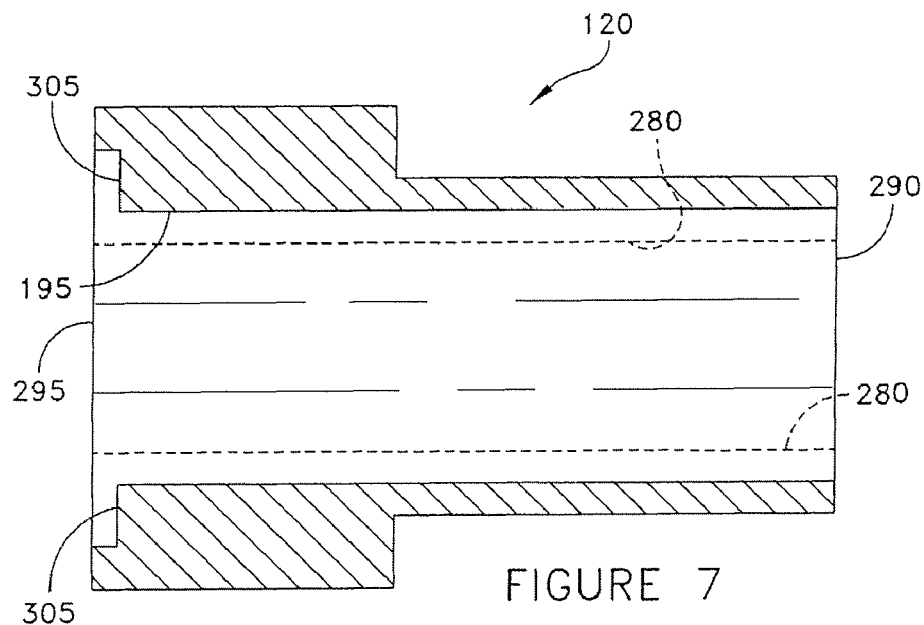
FIGURE 7
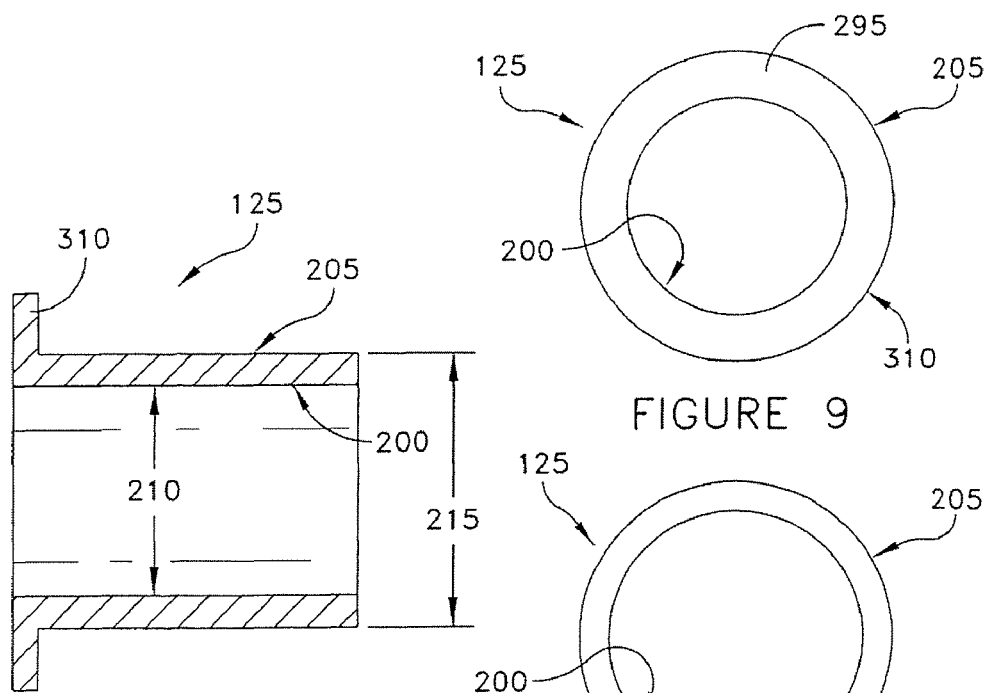
FIGURE 8
FIGURE 9
FIGURE 10

METHOD FOR RETROFITTING AN EXISTING IDLER ASSEMBLY

CROSS-REFERENCE TO RELATED APPLICATIONS

This is a divisional of U.S. nonprovisional application Ser. No. 11/252,894, filed Oct. 18, 2005, now issued as U.S. Pat. No. 7,644,999, which is incorporated by reference for all that it discloses.

BACKGROUND

Tracked vehicles, such as bulldozers, movable cranes, loaders, backhoes, and tanks utilize idler gears and flexible tracks. The idler gear transfers rotation to the flexible tracks as the vehicle moves from one location to another. The idler wheel is typically mounted for rotation on a fixed idler shaft which is rigidly attached to the frame of the tracked vehicle. Unfortunately, as the idler gear rotates around the fixed idler shaft it wears down the portion of the shaft that is in contact with the idler gear. In addition, the wear on the idler shaft is difficult to detect, as well as time consuming and expensive to repair.

SUMMARY OF THE INVENTION

The following summary provides a brief overview of the claimed methods for retrofitting a piece of equipment having a flexible track assembly. However, this summary does not limit the invention in any respect. A detailed and fully enabling disclosure is set forth below in the detailed description section.

In one embodiment, the method for retrofitting a piece of equipment having a flexible track assembly may include: disassembling an existing idler shaft from an idler gear and from at least one bearing block attached to the piece of equipment; positioning a sleeve within an opening in the idler gear; positioning a new idler shaft within an opening of the at least one bearing block and within the opening of the sleeve that is positioned within the opening of the idler gear, the new idler shaft and sleeve being configured to rotate together; positioning at least one bushing liner within the opening of the at least one bearing block; and attaching a retaining device to at least one end of the new idler shaft to retain the new idler shaft axially.

In another embodiment, the method for retrofitting a piece of equipment having a flexible track assembly may include: removing an existing idler shaft and an idler gear from the piece of equipment; removing the idler shaft from the idler gear; positioning a sleeve having a polarity of splines provided on an inner surface thereon, within an opening provided in the idler gear; fixing the sleeve to the idler gear; positioning a new idler shaft within an opening of the sleeve so that splines provided on the new idler shaft engage splines provided on the sleeve; positioning the new idler shaft within an opening of at least one bearing block and within the opening of the sleeve; and attaching a retainer to at least one end of the new idler shaft to retain the new idler shaft axially.

In yet another embodiment, the method for retrofitting a piece of equipment having a flexible track assembly may include: positioning a sleeve within an opening provided in an idler gear; attaching the sleeve to the idler gear; fixedly attaching an idler shaft to the sleeve; positioning the idler shaft within an opening of the sleeve and within at least one bearing block provided on the piece of equipment; attaching a retaining device to at least one end of the idler shaft to retain the idler shaft axially.

In another embodiment, the method for retrofitting a piece of equipment having a flexible track assembly may include: positioning at least one bushing liner within an opening of at least one bearing block; attaching an idler shaft and an idler gear together, so that the idler shaft rotates together with the idler gear; positioning a first end of the idler shaft within an opening of the at least one bushing liner positioned within the opening of the at least one bearing block; and axially restraining the idler shaft within the at least one bushing liner.

In still another embodiment, the method for retrofitting a piece of equipment having a flexible track assembly may include: removing a non-rotating shaft from opposed bearing blocks mounted to a frame assembly of the piece of equipment, and from an idler gear operatively associated therewith; enlarging an opening in the idler gear, the enlarged opening being sized to receive a sleeve therein; positioning the sleeve within the enlarged opening provided in the idler gear; enlarging an opening in each of the opposed bearing blocks, wherein each enlarged opening is sized to receive a bushing liner; positioning the idler gear between the opposed bearing blocks; positioning a shaft within the enlarged opening provided in the opposed bearing blocks and through the sleeve in the idler gear, wherein the shaft and the sleeve each comprise a set of splines that mate with one another; positioning a bushing liner in the enlarged opening in each of the opposed bearing blocks; and attaching a retaining device to each one of the ends of the shaft, wherein the retaining device constrains the shaft from withdrawal from each one of the opposed bearing blocks.

BRIEF DESCRIPTION OF THE DRAWINGS

Illustrative embodiments of the invention are illustrated in the drawings, in which:

FIG. 7 is an illustration of a bearing block having a bore sized to accommodate a rotatable idler shaft therein together with bushing material;

FIGS. 8-10 are illustrations of a brass bushing configured for placement between the idler block and the idler shaft;

DETAILED DESCRIPTION OF AN EMBODIMENT

Figure 1:
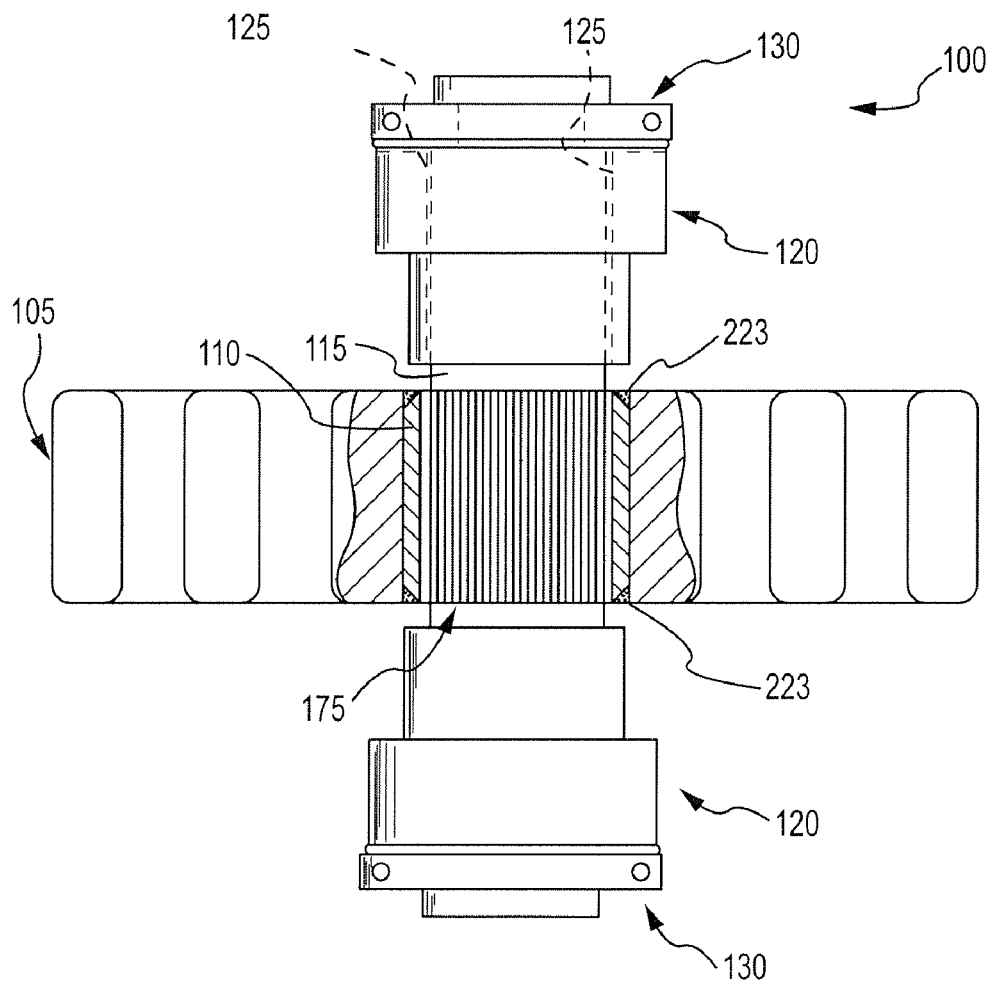
FIG. 1 is an illustration of a rotatable idler shaft assembly of an embodiment, an idler gear and the rotatable idler shaft are fixedly attached to one another, and the ends of the rotatable idler shaft are disposed in brass bushings in bearing blocks.

Referring to FIG. 1, and in an embodiment, there is shown an idler assembly 100 for a shovel having a flexible track assembly. Generally, idler assembly 100 includes an idler gear 105, a sleeve 110, a shaft 115, at least one bearing block 120, at least one bushing liner 125, and at least one retaining device 130.

Idler shaft 115 of idler assembly 100 rotates to provide enhanced component life in contrast with a fixed idle shaft of an idler assembly. This reduces unplanned maintenance and may allow easier inspection for wear of rotatable idler shaft 115 compared to an arrangement having a fixed idler shaft.

Figure 2:
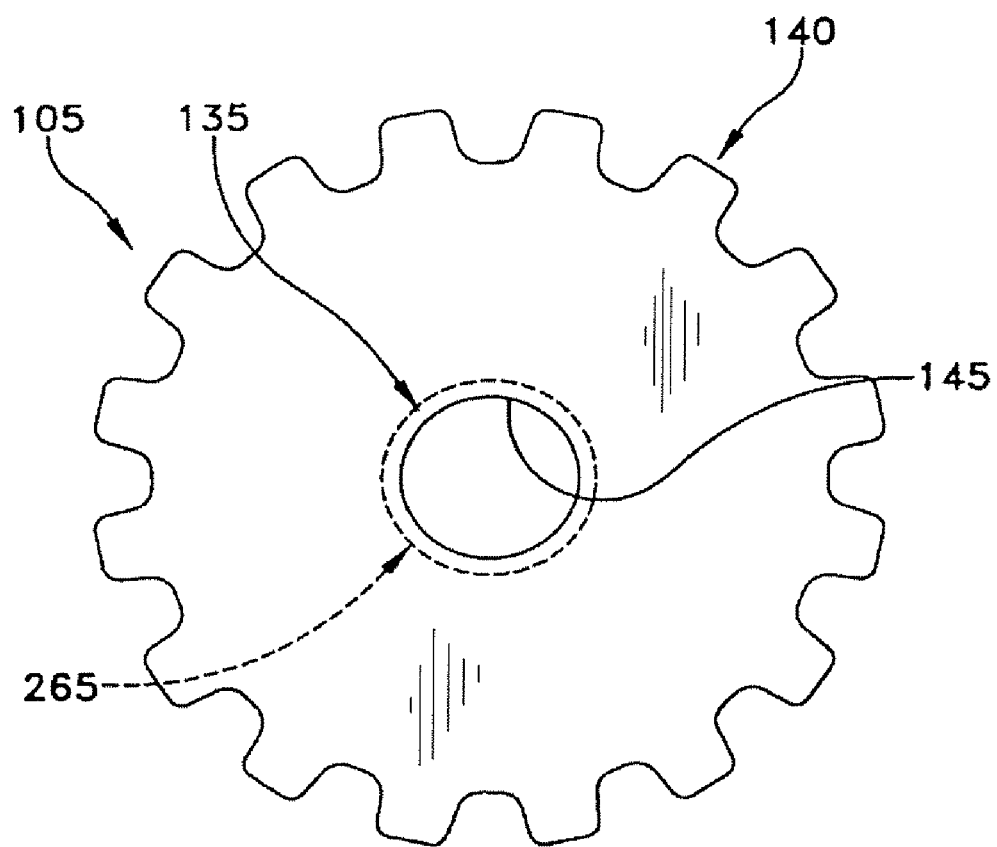
FIG. 2 is an illustration of an idler gear having an opening for attachment to a sleeve and a shaft.
Figure 3:
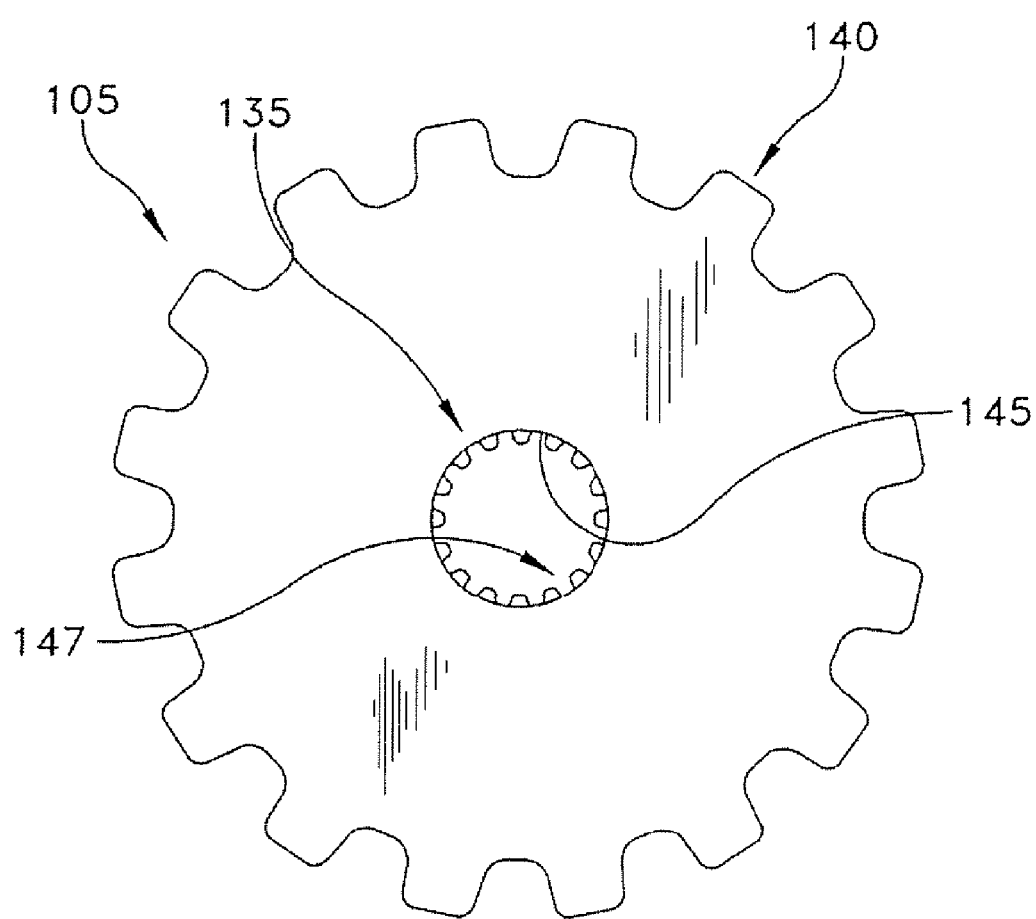
FIG. 3 is an illustration of an idler gear having an opening with a set of splines for attachment to a shaft having a set of splines.

Referring now to FIGS. 1, 2, and 3, there is shown idler gear 105 having an inner portion 135 and an outer portion 140. An opening 145 is formed through inner portion 135. Outer portion 140 is operatively associated with a flexible track assembly.

Figure 5:
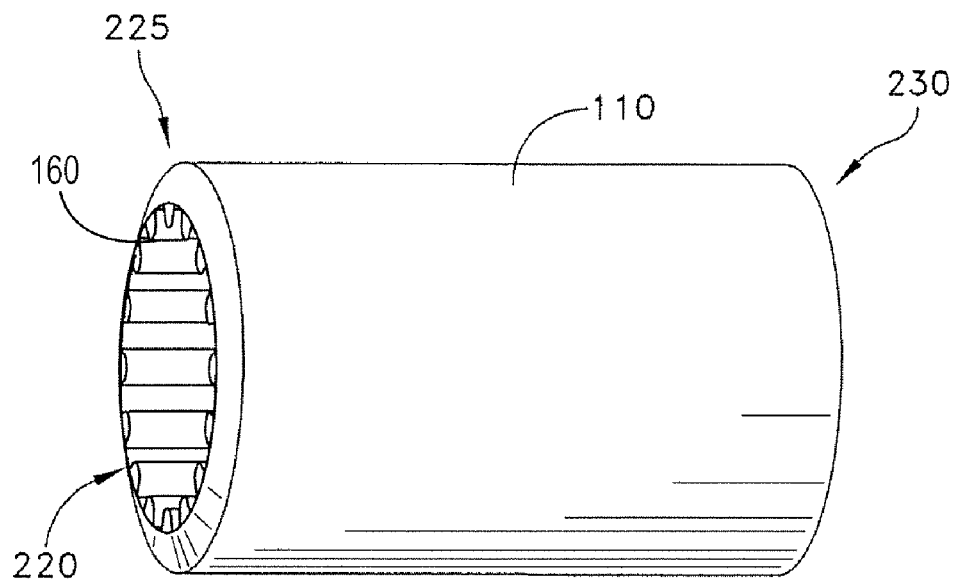
FIGS. 5 and 6 are illustrations of an attachment sleeve having splines formed on the inner wall for attachment to splines formed on a rotatable shaft, and the outer wall of the sleeve and the opening of the idler gear sized for attachment to one another.
Figure 6:
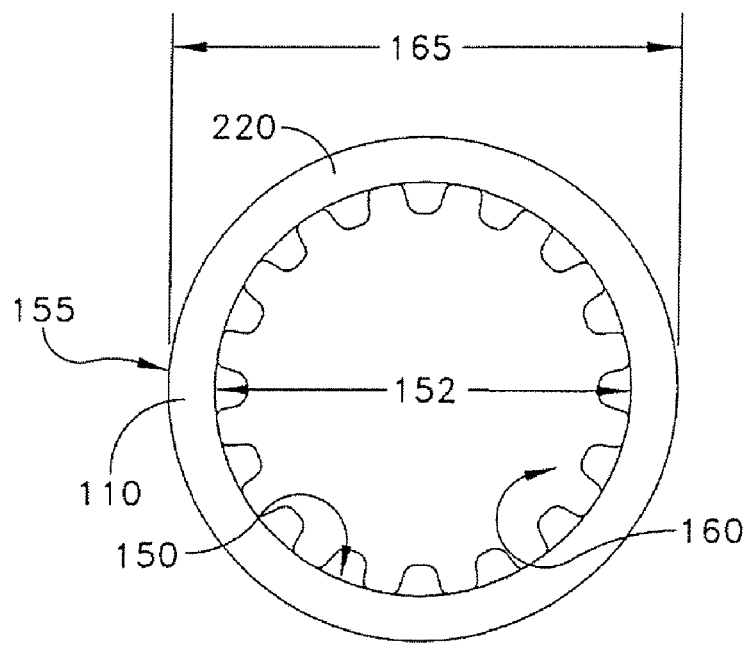

Referring to FIGS. 2, 5 and 6, and in an embodiment, sleeve 110 may be secured within opening 145 of idler gear 105. In one embodiment, sleeve 110 and idler gear 105 have a metal to metal fit. Optionally, sleeve 110 and idler gear 105 are welded together.

Referring to FIG. 3, and in an embodiment, a set of splines 147 may be disposed within opening 145 of idler gear 105. In one embodiment, shaft 115 and idler gear 105 may be joined directly to one another.

Referring to FIGS. 1, 5 and 6, there is shown sleeve 110 having an inner surface 150 and an outer surface 155 in opposition to one another. Inner surface 150 of sleeve 110 may form an inner diameter 152. A set of splines 160 may be disposed on inner surface 150. Outer surface 155 of sleeve 110 may form an outer diameter 165 sized for attachment within inner portion 135 of idler gear 105.

Figure 4:
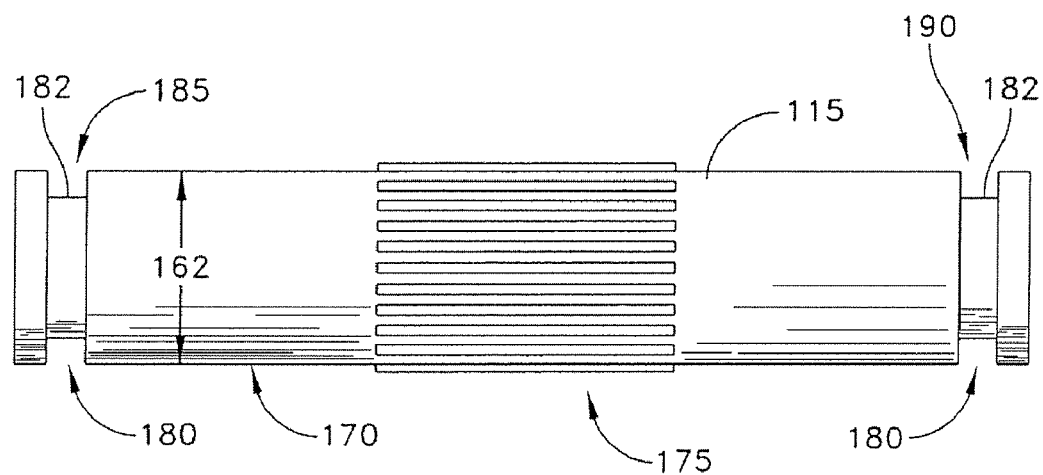
FIG. 4 is an illustration of a shaft with splines for selective attachment of the idler gear with the shaft, and a pair of radial recesses disposed at opposed ends of the shaft for attachment of a retainer thereto.

Referring to FIG. 4, there is shown shaft 115 having an outer portion 170 forming an outer diameter 162 with a set of splines 175 thereon. In an embodiment, outer diameter 162 is sized for placement within inner diameter 152 of sleeve 110. The set of splines 175 of shaft 115 and the set of splines 160 of sleeve 110 may be sized for engagement with one another. In an embodiment, a pair of connectors 180 may be disposed at opposed ends 185, 190 of shaft 115.

Referring to FIGS. 1 and 7, there is shown bearing block 120 which is generally in attachment to the frame assembly of the shovel. A bore 195 extends through each of one of the at least one bearing block 120. In one embodiment, a countersink 305 is formed in bearing block 120.

Referring to FIGS. 1, and 8-10, there is shown one of the at least one bushing liner 125 for disposal within the at least one bearing block 120. Each bushing liner 125 has an inner surface 200 and an outer surface 205 in opposition to one another. Inner surface 200 of each one of the at least one bushing liner 125 forms an inner diameter 210 sized for placement of shaft 115 therein. Outer surface 205 of each of the at least one bushing liner 125 forms an outer diameter 215 sized for placement within bore 195 of each one of the pair of bearing blocks 120.

Figure 11:
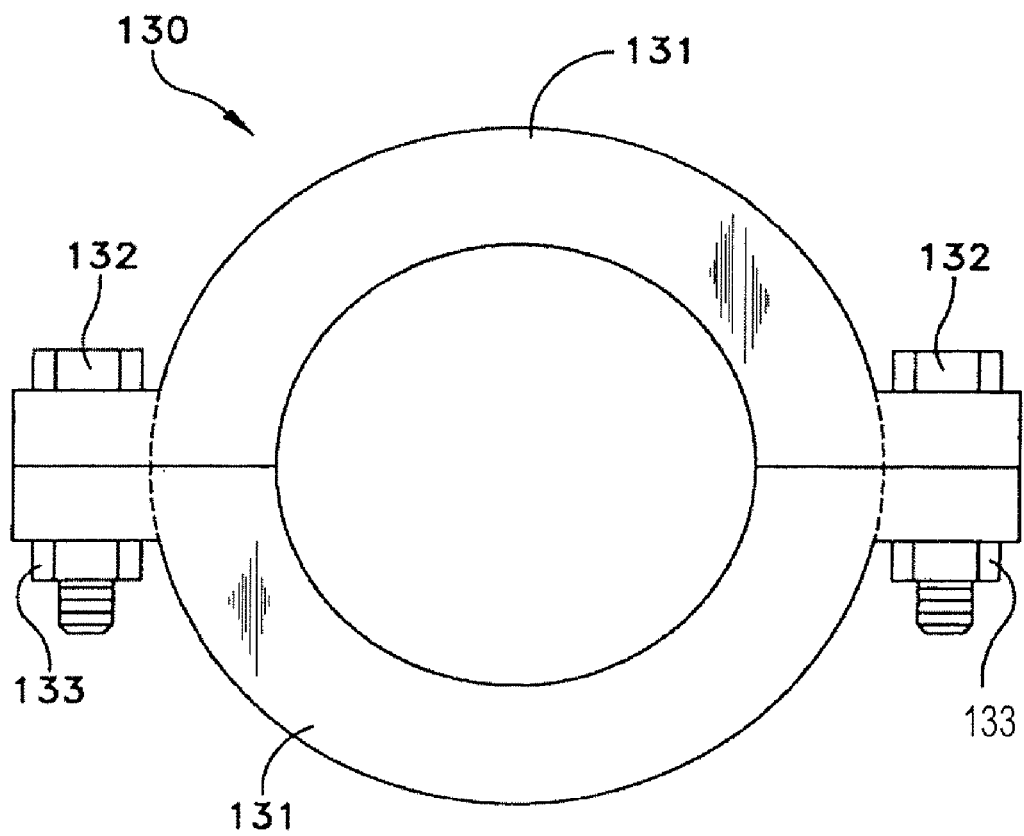
FIG. 11 is an illustration of a retaining device sized for attachment with the end of the idler shaft and to provide an axial thrust area to constrain axial movement of the shaft through each of the brass bushings.

Referring to FIGS. 1 and 11, there is shown the pair of retaining devices 130 for constraining shaft 115 from withdrawal from bore 195 of each one of bearing blocks 120. In an embodiment, the at least one retaining device 130 may be in removable attachment to connectors 180 disposed at opposed ends 185, 190 of idler shaft 115, respectively. Shaft 115 rotates within bearing block 120 as idler gear 105 rotates in response to movement of flexible track assembly. In an embodiment, the at least one retaining device 130 may rotate with shaft 115.

In an embodiment, grooves 182 (FIG. 4) may form the connectors 180 at opposed ends 185, 190 of shaft 115. In one embodiment, the at least one retaining device 130 may comprise at least two collars 131 (FIG. 11), which may include a pair of collars 131 attached by bolts 132 and nuts 133. In an embodiment, retaining device 130 rotates in attachment with shaft 115.

Figure 18:
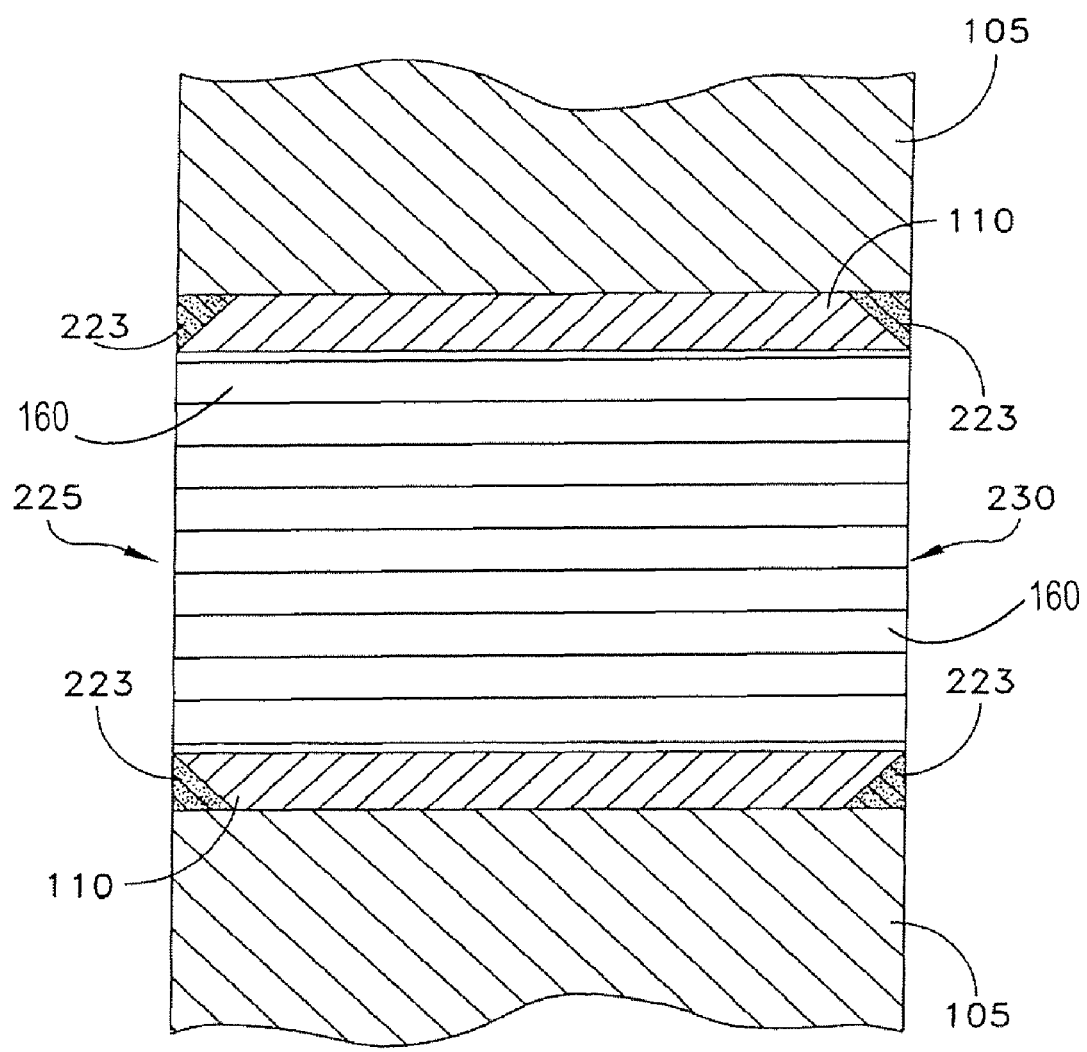
FIG. 18 is a partial cross-section of the gear and sleeve illustrated in FIGS. 1, 2, and 5.

Referring to FIG. 5, and in an embodiment, sleeve 110 may comprise a beveled edge 220 at opposed ends 225, 230. Referring to FIG. 18, beveled edge 220 may provide a recess between sleeve 110 and idler gear 105. For example, beveled edge 220 may extend at a 45 degree angle from inner surface 150. A weld 223 may be placed in the recess formed by beveled edge 220. This weld 223 may be formed, for example, by stainless wire or electrode, and may also be blended to finish the surface.

In an embodiment, the set of splines 160 may extend the full length of sleeve 110. In one embodiment, the set of splines 160 may cover a portion of sleeve 110 and be set back at each end. Optionally, ends of the set of splines 160 may be tapered inwardly for ease of assembly.

Figure 12:
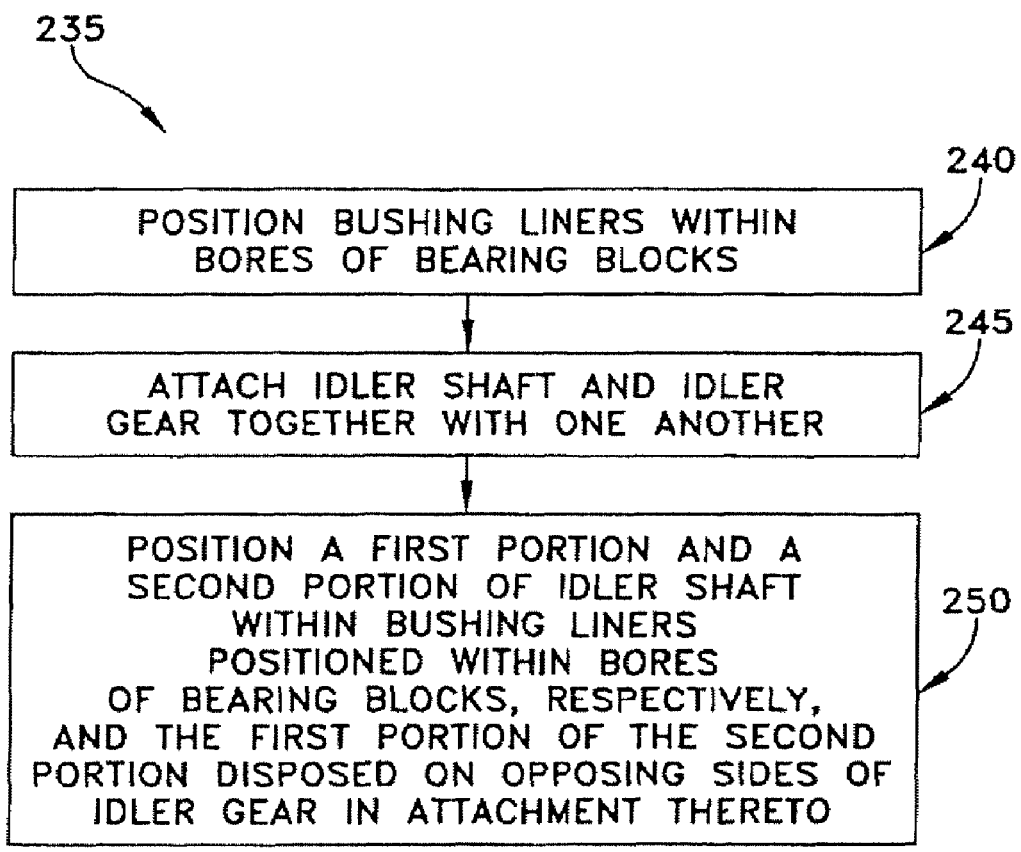
FIGS. 12-16 are flow chart diagrams illustrating methods for retrofitting a shovel with an improved idler assembly.

Looking at FIG. 12, and in an embodiment, there is provided a method 235 for retrofitting a shovel with a flexible track assembly from an existing idler assembly to an improved idler assembly 100. Method 235 generally comprises placing or positioning 240 pair of bushing liners 125 within bores 195 of the pair of bearing blocks 120, respectively. Method 235 generally comprises attaching 245 idler shaft 115 and idler gear 105 together with one another, wherein shaft 115 rotates together with idler gear 105. Method 235 generally comprises positioning 250 a first portion and a second portion of idler shaft 115 within bushing liners 125 positioned within bores 195 of bearing blocks 120, respectively, and the first portion and the second portion disposed on opposing sides of idler gear 105 in attachment thereto.

Figure 13:
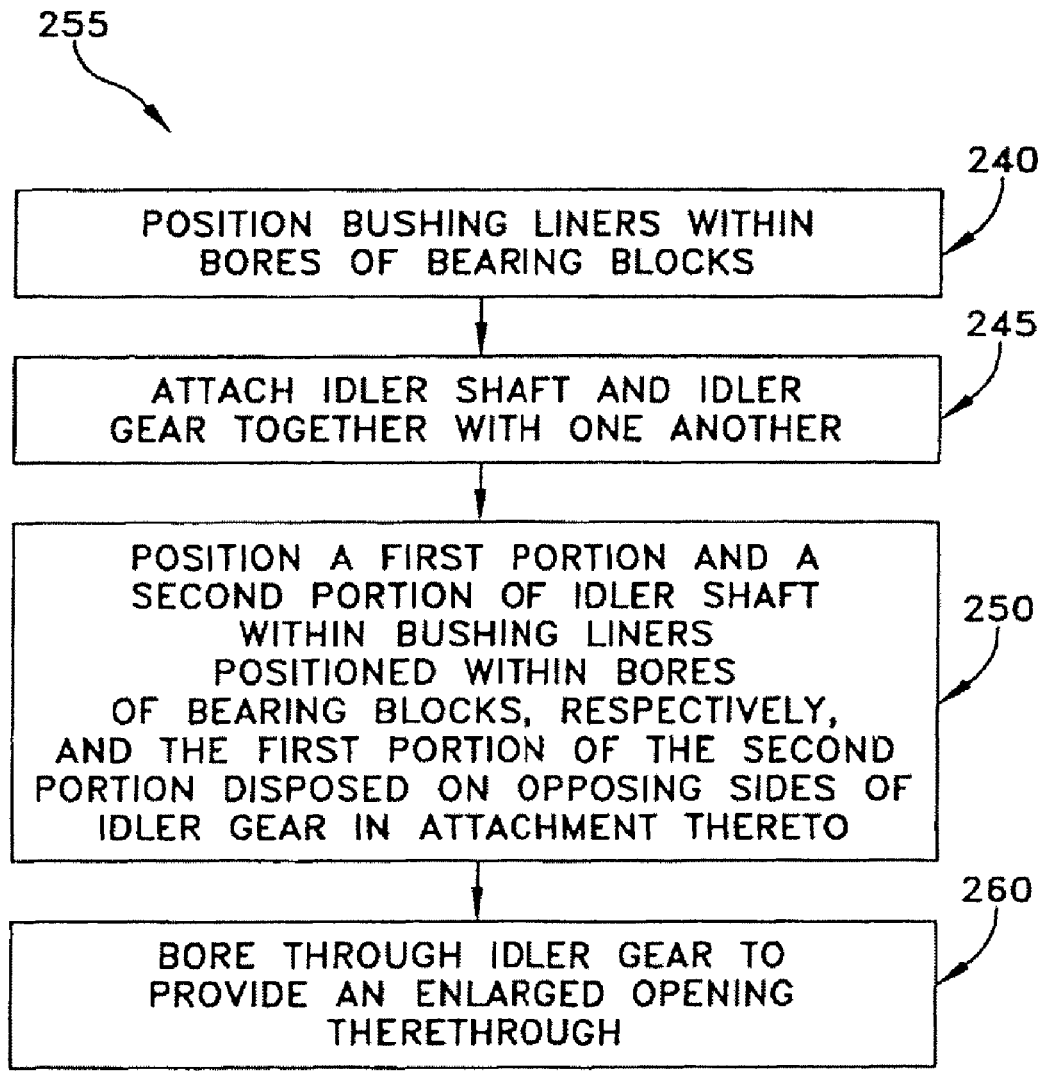

Referring to FIG. 13, and in an embodiment, there is provided a method 255 which includes method 235 and further comprises boring 260 through idler gear 105 to provide an enlarged opening 265 therethrough. Enlarged opening 265 may be sized for attachment of sleeve 110 therein.

Figure 14:
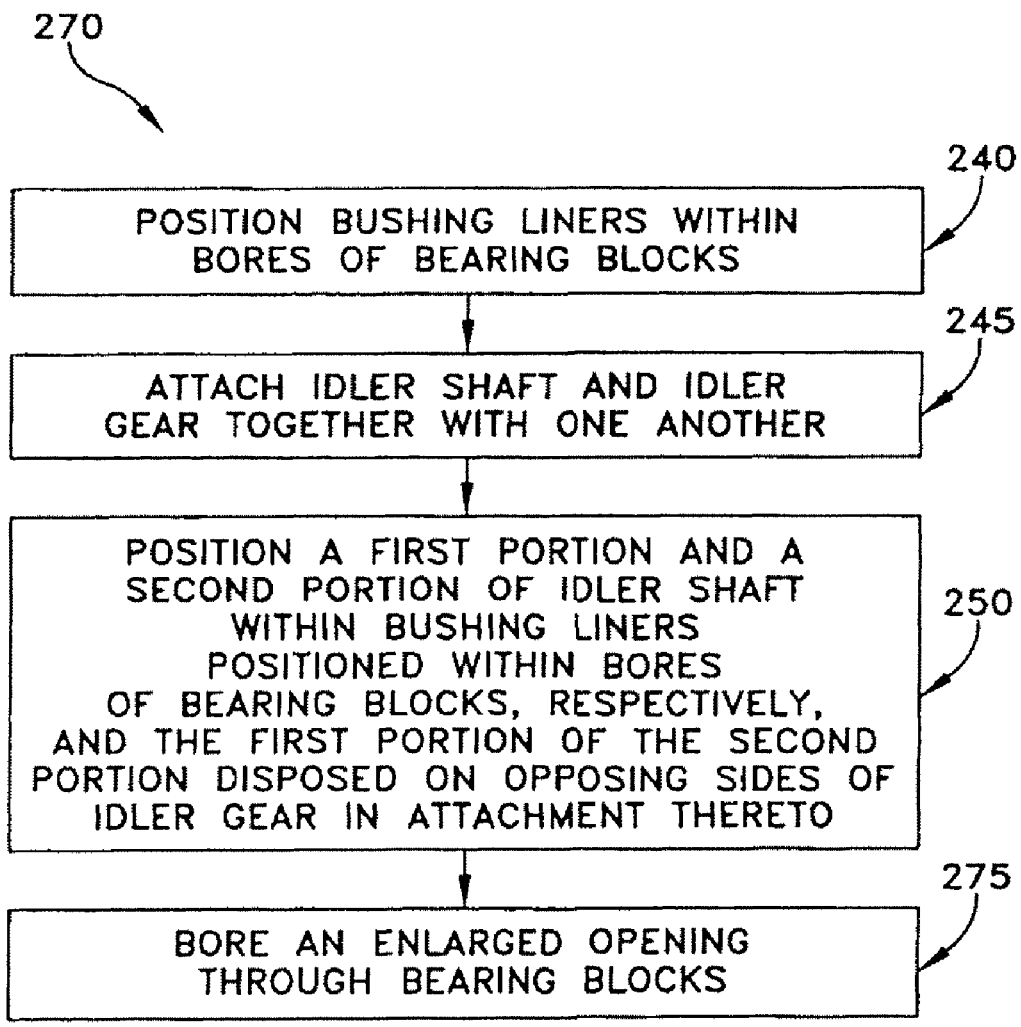

Referring to FIG. 14, and in an embodiment, there is provided a method 270 which includes method 235 and further comprises boring 275 an enlarged opening 280 through bearing blocks 120. Enlarged opening 280 may be sized for placement of bushing liners 125 therein.

Figure 15:
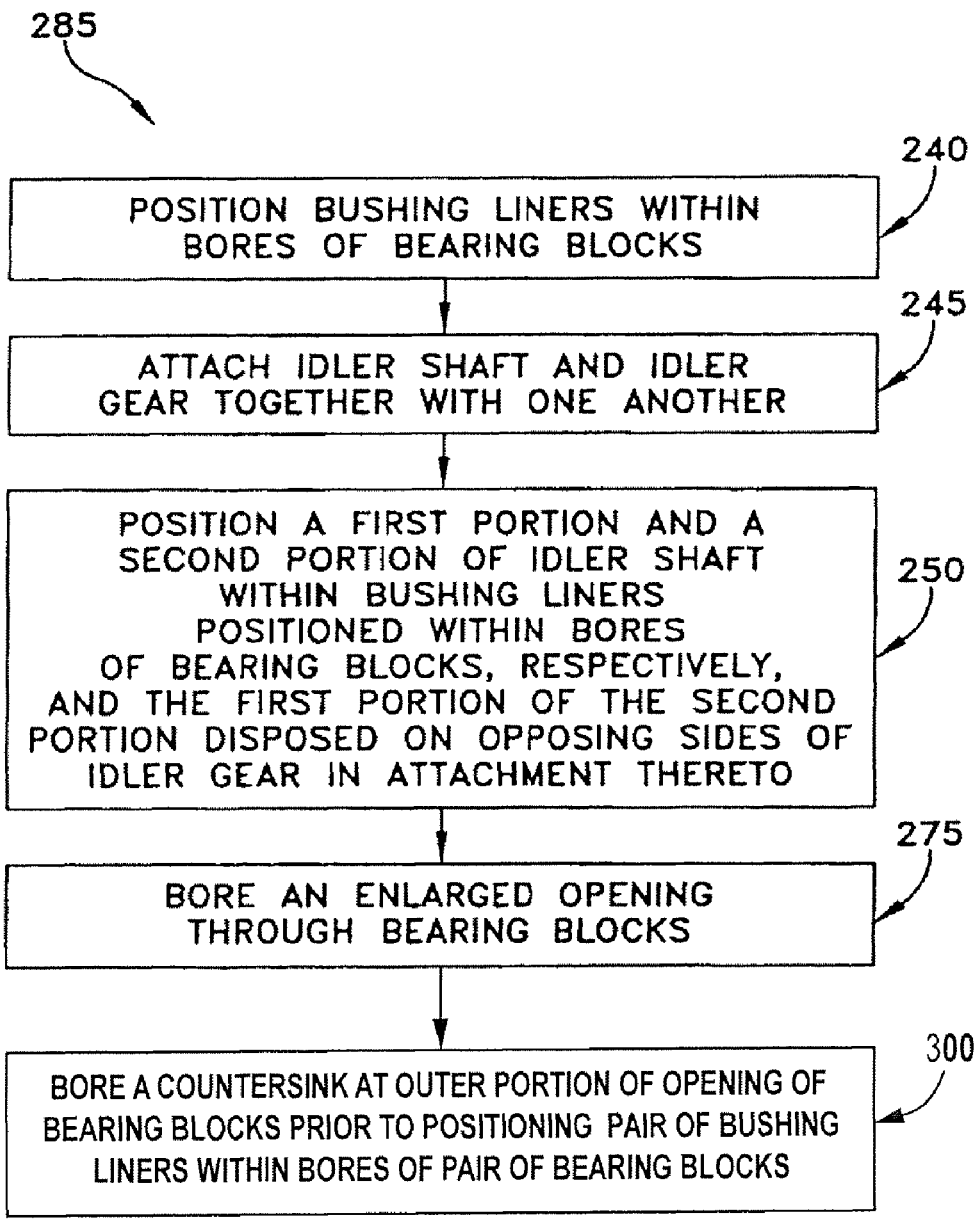

Referring to FIG. 15, and in an embodiment, there is provided a method 285 which includes method 270, bearing blocks 120 each have an inner portion 290 and an outer portion 295 in opposition to one another, and inner portion 290 is disposed toward idler gear 105. Method 285 further comprises boring 300 a countersink 305 at outer portion 295 of opening 280 of bearing blocks 120 prior to positioning pair of bushing liners 125 within bores 195 of pair of bearing blocks 120. In an embodiment, countersinks 305 provide an area for disposition of a thrust flange 310 extending from bushing liner 125.

Figure 16:
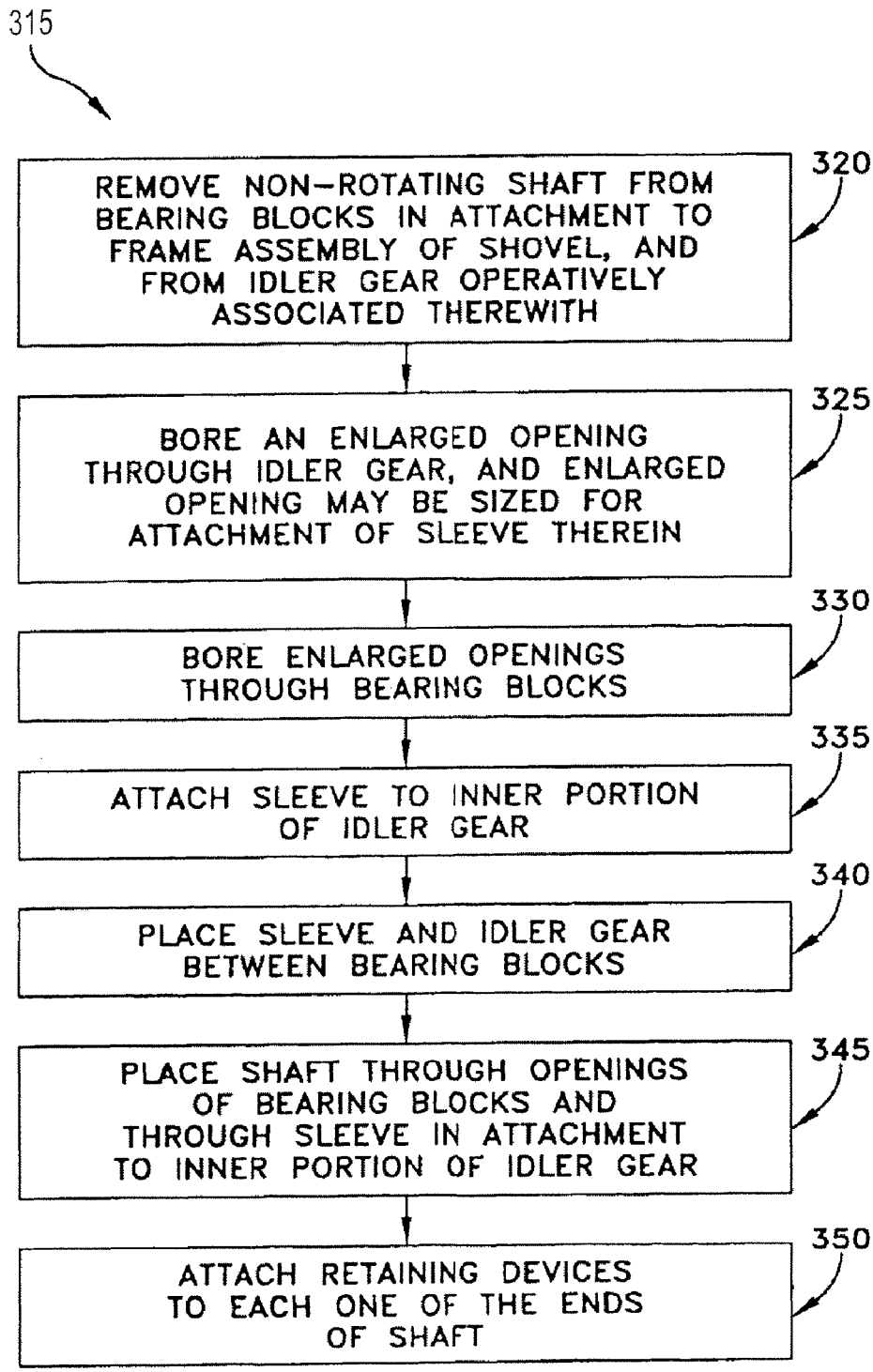

Looking at FIG. 16, and in one embodiment, there is provided a method 315 for retrofitting a shovel with flexible track assembly from an existing idler assembly to an improved idler assembly 100.

Method 315 generally comprises disassembling, detaching, or removing 320 a non-rotating shaft from the pair of bearing blocks 120 in attachment to the frame assembly of the shovel, and from the idler gear 105 operatively associated therewith. Method 315 generally comprises boring 325 an enlarged opening 265 through the idler gear 105. Enlarged opening 265 may be sized for attachment of sleeve 110 therein.

Method 315 generally comprises boring 330 enlarged openings 280 through bearing blocks 120, respectively. Enlarged opening 280 may be sized for placement of bushing liners 125 in bearing blocks 120, respectively.

Method 315 generally comprises attaching 335 sleeve 110 to inner portion 135 of idler gear 105. Method 315 generally comprises placing 340 sleeve 110 and idler gear 105 between the pair of enlarged openings 280 of the pair of bearing blocks 120.

Method 315 generally comprises placing 345 shaft 115 through the pair of enlarged openings 280 of the pair of bearing blocks 120 and through sleeve 110 in attachment to inner portion 135 of idler gear 105. Sleeve 110 and shaft 115 may each comprise a set of splines 160, 175 that mate with one another, respectively.

Method 315 generally comprises attaching 350 retaining devices 130 to each one of the ends 185, 190 of shaft 115. Retaining devices 130 may constrain shaft 115 from withdrawal from bores 195 of each one of bearing blocks 120.

Figure 17:
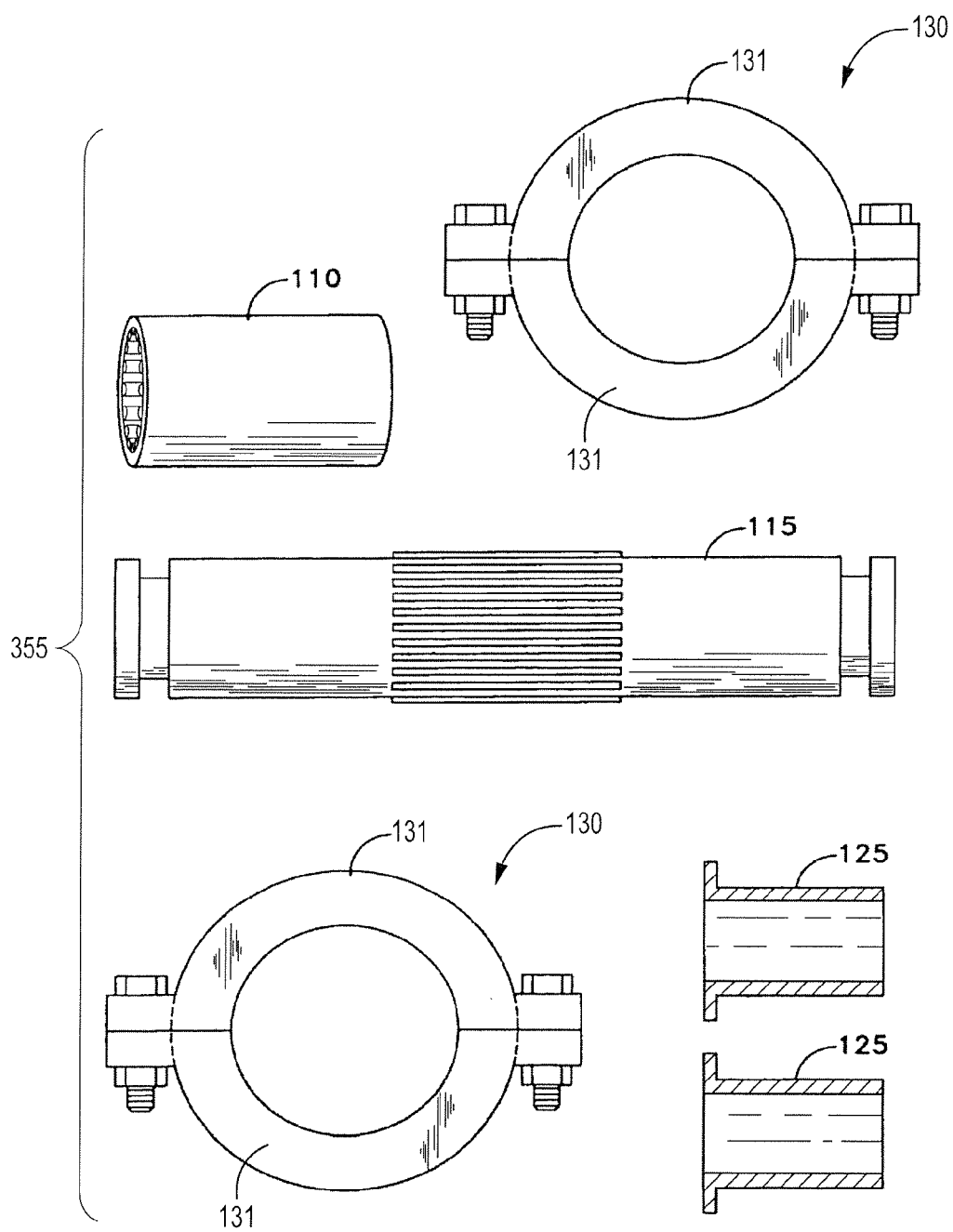
FIG. 17 is a kit for retrofitting a shovel with a flexible track assembly.

Looking at FIG. 17, and in one embodiment, there is provided a kit 355 for retrofitting a shovel with a flexible track assembly. Kit 355 may comprise sleeve 110, shaft 115, bushing liners 125, and retaining devices 130. In an embodiment, connectors 180 comprise grooves 182 formed in the opposed ends 185, 190 of shaft 115. In one embodiment, the pair of retaining devices 130 in kit 355 comprise of two collars 131. In an embodiment, the material hardness of bushing liners 125 is less than the material hardness of shaft 115. In one embodiment, the material hardness of bushing liners 125 is less than the material hardness of bearing blocks 120.

In an embodiment, there is provided an idler assembly for a shovel having flexible track assembly. Generally, the idler assembly may comprise idler gear 105, shaft 115, bearing blocks 120, bushing liners 125, and retaining devices 130.

Idler gear 105 may be operatively associated with flexible track assembly. Shaft 115 is fixedly connected to idler gear 105. Shaft 115 has a first portion and a second portion on opposed sides of the idler gear 105 such that the shaft 115 rotates together with idler gear 105.

Bearing blocks 120 may be in attachment to the frame assembly of the shovel. Each of bearing blocks 120 may form bore 195 therethrough. The first portion and the second portion of shaft 115 may each extend through one of bearing blocks 120, respectively.

Bushing liners 125 may be disposed within bores 195 of bearing blocks 120, respectively. Each of bushing liners 125 may have inner surface 200 and outer surface 205 in opposition to one another. Inner surface 200 of each of the bushing liners 125 may form inner diameter 210 sized for placement of shaft 115 therein. Outer surface 205 of each of bushing liners 125 may form outer diameter 215 sized for placement within bore 195 of each of the pair of bearing blocks 120.

Retaining devices 130 are provided for constraining shaft 115 from withdrawal from bore 195 of each one of the bearing blocks 120. Shaft 115 may rotate within the bearing blocks 120 as idler gear 105 rotates in response to movement of the flexible track assembly.

What is claimed is:

1. A method for retrofitting a piece of equipment having a flexible track assembly, the method comprising:
    disassembling an existing idler shaft from an idler gear and from at least one bearing block attached to the piece of equipment;
    positioning a cylindrical sleeve within an opening in the idler gear, wherein the cylindrical sleeve is substantially contained within the opening in the idler gear;
    attaching the cylindrical sleeve to the idler gear;
    positioning a new idler shaft within an opening of the at least one bearing block and within an opening of the cylindrical sleeve that is positioned within the opening of the idler gear, the new idler shaft and the cylindrical sleeve being configured to rotate together;
    positioning at least one bushing liner within the opening of the at least one bearing block; and
    attaching a retaining device to at least one end of the new idler shaft to retain the new idler shaft axially.

2. The method of claim 1, further comprising forming a countersink within the opening of the at least one bearing block.

3. The method of claim 1, further comprising enlarging the opening of the idler gear prior to positioning the cylindrical sleeve within the opening of the idler gear.

4. The method of claim 1, further comprising welding the cylindrical sleeve to the idler gear.

5. The method of claim 1, further comprising placing the idler gear and the cylindrical sleeve adjacent to the at least one bearing block prior to positioning the new idler shaft within the opening of the at least one bearing block and within the opening of the cylindrical sleeve.

6. The method of claim 1, further comprising attaching a second retainer to a second end of the new idler shaft to retain the new idler shaft axially.

7. A method for retrofitting a piece of equipment having a flexible track assembly, the method comprising:
    removing an existing idler shaft and an idler gear from the piece of equipment;
    removing the idler shaft from the idler gear;
    positioning a cylindrical sleeve having a plurality of splines provided on an inner surface thereon, within an opening provided in the idler gear, wherein the cylindrical sleeve is substantially contained within the opening provided in the idler gear;
    fixing the cylindrical sleeve to the idler gear;
    positioning a new idler shaft within an opening of the cylindrical sleeve so that splines provided on the new idler shaft engage the splines provided on the cylindrical sleeve;
    positioning the new idler shaft within an opening of at least one bearing block and within the opening of the cylindrical sleeve; and
    attaching a retainer to at least one end of the new idler shaft to retain the new idler shaft axially.

8. The method of claim 7, further comprising enlarging the opening provided in the at least one bearing block prior to positioning the new idler shaft within the opening of the at least one bearing block.

9. The method of claim 8, further comprising placing at least one bushing liner within the enlarged opening provided in the at least one bearing block before positioning the new idler shaft within the opening of the at least one bearing block.

10. The method of claim 7, further comprising enlarging the opening within the idler gear prior to positioning the cylindrical sleeve within the opening provided within the idler gear.

11. The method of claim 7, further comprising welding the cylindrical sleeve to the idler gear.

12. The method of claim 7, further comprising attaching a second retainer to a second end of the new idler shaft to retain the new idler shaft axially.

13. A method for retrofitting a piece of equipment having a flexible track assembly, the method comprising:
- positioning a cylindrical sleeve within an opening provided in an idler gear, wherein the cylindrical sleeve is substantially contained within the opening provided in the idler gear;
- attaching the cylindrical sleeve to the idler gear;
- positioning an idler shaft within an opening of the cylindrical sleeve and within an opening of at least one bearing block provided on the piece of equipment;
- fixedly attaching the idler shaft to the cylindrical sleeve; and
- attaching a retaining device to at least one end of the idler shaft to retain the idler shaft axially.

14. The method of claim 13, further comprising enlarging the opening in the at least one bearing block and inserting a bushing liner within the enlarged opening of the at least one bearing block before positioning the idler shaft and the idler gear within the at least one bearing block.

15. The method of claim 13, further comprising enlarging the opening provided in the idler gear to provide an enlarged opening therethrough, wherein the enlarged opening is sized to receive the cylindrical sleeve therein.

16. The method of claim 13, further comprising welding the cylindrical sleeve to the idler gear.

17. The method of claim 13, wherein fixedly attaching the idler shaft to the cylindrical sleeve comprises engaging a set of splines provided within the opening of the cylindrical sleeve with a set of splines provided on the idler shaft.

18. The method of claim 13, further comprising attaching a second retainer to a second end of the idler shaft to retain the idler shaft axially.

19. A method for retrofitting a piece of equipment having a flexible track, the method comprising:
- removing a non-rotating shaft from opposed bearing blocks mounted to a frame assembly of the piece of equipment, and from an idler gear operatively associated therewith;
- enlarging an opening in the idler gear, the enlarged opening being sized to receive a cylindrical sleeve therein;
- positioning the cylindrical sleeve within the enlarged opening in the idler gear, wherein the cylindrical sleeve is substantially contained within the enlarged opening in the idler gear;
- enlarging an opening in each of the opposed bearing blocks, wherein each of the enlarged openings is sized to receive a bushing liner;
- positioning the idler gear between the opposed bearing blocks;
- positioning a shaft within the enlarged opening provided in the opposed bearing blocks and through the cylindrical sleeve in the idler gear, wherein the shaft and the cylindrical sleeve each comprise a set of splines that mate with one another;
- positioning the bushing liner in the enlarged opening in each of the opposed bearing blocks; and
- attaching a retaining device to each one of the ends of the shaft, wherein the retaining device constrains the shaft from withdrawal from each one of the opposed bearing blocks.

* * * * *